US006247025B1

(12) United States Patent
Bacon (10) Patent No.: US 6,247,025 B1
(45) Date of Patent: *Jun. 12, 2001

(54) LOCKING AND UNLOCKING MECHANISM FOR CONTROLLING CONCURRENT ACCESS TO OBJECTS

(75) Inventor: David Francis Bacon, New York, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/937,311

(22) Filed: Sep. 22, 1997

Related U.S. Application Data (60) Provisional application No. 60/052,938, filed on Jul. 17, 1997.

(51) Int. Cl.$^7$ .................................................... G06F 17/30
(52) U.S. Cl. ........................... 707/206; 707/102; 707/103
(58) Field of Search ................................ 707/206, 103, 707/102, 200, 1; 395/683, 726, 670, 672, 877, 872; 711/152, 113, 170, 141, 169; 364/228

(56) References Cited

U.S. PATENT DOCUMENTS

| 4,574,350 | 3/1986 | Starr | 710/200 |
|---|---|---|---|
| 5,063,504 | 11/1991 | Jordan, Jr. | 710/200 |
| 5,088,036 | * 2/1992 | Ellis et al. | 707/206 |

(List continued on next page.)

FOREIGN PATENT DOCUMENTS

| 2222389 | 11/1997 | (CA) | 219/93 |

OTHER PUBLICATIONS

Anderson, T.E. The performance of spin lock alternatives for shared memory multiprocessors. IEEE Transactions on Parallel and Distributed Systems 1, 1 (Jan. 1990), 6–16.

Dijkstra, E. W. Solution of a problem in concurrent programming and control. Commun. ACM 8, 9 (Sep. 1965), 569.

(List continued on next page.)

Primary Examiner—Wayne Amsbury
Assistant Examiner—Thu-Thao Havan
(74) Attorney, Agent, or Firm—F. Chau & Associates, LLP (57) ABSTRACT

A lock/unlock mechanism to control concurrent access to objects in a multi-threaded computer processing system comprises two parts: a thread pointer (or thread identifier), and a one-bit flag called a "Bacon bit". Preferably, when an object is not locked (i.e., no thread has been granted access to the object), the thread identifier and Bacon bit are set to 0. When an object is locked by a particular thread (i.e., the thread has been granted access to the object), the thread identifier is set to a value that identifies the particular thread; if no other threads are waiting to lock the object, the Bacon bit is set to 0; however, if other threads are waiting to lock the object, the Bacon bit is set to '1', which indicates the there is a queue of waiting threads associated with the object. To lock an object, a single CompareAndSwap operation is preferably used, much like with spin-locks; if the lock is already held by another thread, enqueueing is handled in out-of-line code. To unlock an object, in the normal case, a single CompareAndSwap operation may be used. This single operation atomically tests that the current thread owns the lock, and that no other threads are waiting for the object (i.e., the Bacon bit is '0'). A global lock is preferably used to change the Bacon bit of the lock. This provides an lock/unlock mechanism which combines many of the desirable features of both spin locking and queued locking, and can be used as the basis for a very fast implementation of the synchronization facilities of the Java language.

46 Claims, 3 Drawing Sheets

U.S. PATENT DOCUMENTS

| | | | |
|---|---|---|---|
| 5,261,069 | | 11/1993 | Wilkinson et al. ............... 711/145 |
| 5,287,521 | | 2/1994 | Nitta et al. ...................... 710/200 |
| 5,392,433 | | 2/1995 | Hammersley et al. ........... 710/200 |
| 5,410,697 | | 4/1995 | Baird et al. ...................... 711/152 |
| 5,440,743 | | 8/1995 | Yokota et al. ................... 710/200 |
| 5,485,626 | * | 1/1996 | Lawlor et al. ................... 395/683 |
| 5,553,240 | | 9/1996 | Madduri .......................... 709/225 |
| 5,644,768 | * | 7/1997 | Periwal et al. .................. 395/672 |
| 5,802,582 | * | 9/1998 | Ekanadham et al. ............ 711/152 |
| 5,852,731 | * | 12/1998 | Wang et al. ..................... 395/670 |

OTHER PUBLICATIONS

Goodman, J. R., Vernon, M. K., and Woest, P. J. Efficient synchronization primitives for large–scale cache–coherent multiprocessors. In Proceedings of the Third International Conference on Architectural Support for Programming Languages and Operating Systems (Boston, Massachussetts, Apr. 1989). ACM Press, New York, New York. pp. 64–75.

Gottlieb, A., Lubachevsky, B. D., and Rudolph, L. Basic techniques for the efficient coordination of very large numbers of cooperating sequential processors. ACM Trans. Program, Lang. Syst. 5, 2 (Ap 1983), 164–189.

Hoare, C. A. R. Monitors: An operating system structuring concept. Commun. ACM 17, 10 (Oct. 1974), 549–557.

Kruskal, C. P., Rudolph, L., and Snir, M. Efficient synchronization on multiprocessors with shared memory. In Proceedings of the Fifth Annual ACM Symposium on Principles of Distributed Computing (1986), pp. 218–228.

Lamport, L. The mutual exclusion problem. J. ACM 33, 2 (Apr. 1986), 313–348.

Lamport, L. A fast mutual exclusion algorithm. ACM Trans. Comput. Syst. 5, 1 (Feb. 1987), 1–11.

Lampson, B. W., and Redell, D. D. Experience with processes and monitors in Mesa. Commun. ACM 23, 2 (1980), 105–117.

Mellor–Crummey, J. M., and Scott, M. L. Algorithms for scalable synchronization on shared–memory multiprocessors. ACM Trans. Comput. Syst. 9, 1 (Feb. 1991), 1–20.

Peterson, G. L. A new solution to Lamport's concurrent programming problem using small shared variables. ACM Trans. Program, Lang. Syst. 5, 1 (Jan. 1983), 56–65.

Raynal, M. Algorithms for Mutual Exclusion. MIT Press Series in Scientific Computation. MIT Press, Cambridge, Massachussetts, 1986. Translated from the French by D. Beeson.

* cited by examiner

LOCKING AND UNLOCKING MECHANISM FOR CONTROLLING CONCURRENT ACCESS TO OBJECTS

CROSS REFERENCE TO RELATED APPLICATIONS

This application claims priority from Provisional Application Ser. No. 60/052,938 filed Jul. 17, 1997, herein incorporated by reference in its entirety.

BACKGROUND OF THE INVENTION

1. Field of the Invention

The present invention relates generally to locking/unlocking mechanisms for controlling concurrent access to objects in a digital computer system and, more particularly, to a locking and unlocking mechanism with minimal cost in both time and space.

2. Background Description

Controlling concurrent access to data structures is a fundamental problem in both uniprocessor and multiprocessor systems. In multiprocessor systems access may be truly concurrent; in uniprocessor systems interrupts and time slicing may occur in the midst of an operation that must be atomic to maintain correctness.

Concurrent access must be controlled for any shared resource that might be accessed by more than one concurrent process. For instance, database records in a bank account database must be locked so that a customer at an ATM and a teller at a workstation do not simultaneously modify the same account record. Or a printer connected to a personal computer must be locked so that a word processor and a spreadsheet do not simultaneously begin printing; instead, one application must wait until the other finishes.

One of the most popular methods for controlling concurrent access to objects is to associate a lock with each object. The term object refers to a data structure which is a unit of atomicity; other literature may also use the terms record or block. A lock is assigned to a thread of control or a process or a processor, or to whatever unit of concurrency is being employed. We will use the term thread for the unit of concurrency.

While one thread owns the lock on an object, no other thread may perform any operations upon that object. This is the principle of mutual exclusion.

If a thread attempts to lock an object and discovers that the object is already locked, it may not perform operations on that object. The thread may either (1) give up and perform other operations, perhaps attempting to lock the object again later; (2) place itself on a queue of threads waiting to be granted access to the object; or (3) continuously retry the locking operation until it succeeds (known as spin-locking).

The issues surrounding concurrency control and locking are discussed in detail in the article *A Survey of Synchronization Methods for Parallel Computers*, by Anne Dinning, IEEE Computer volume 22, number 7, Jul. 1989, and in the books *Operating Systems Concepts* by Abraham Silberschatz and James L. Peterson, Addison-Wesley 1988, and *Concurrency Control and Recovery in Database Systems* by Philip A. Bernstein, Vassos Hadzilacos, and Nathan Goodman, Addison-Wesley 1987.

Whatever type of locking is employed, it must be implemented using operations that are atomic—uninterruptable and indivisible. Such operations are typically provided as special machine instructions, such as the CMPXCHG instruction of the Intel Pentium processors, and the Load and Reserve and Store Conditional instructions of the PowerPC processors.

The present invention is described below using an abstract atomic operation called CompareAndSwap, which can be implemented using the CMPXCHG instruction, Load and Reserve/Store Conditional instructions, or whatever atomic primitive is available on the computer hardware. CompareAndSwap takes three parameters: address, oldValue, and newValue. It examines the value stored in memory at address, and if that value is equal to oldValue, it changes it to newValue and returns true; otherwise it leaves the value at address unchanged and returns false.

The CompareAndSwap operation is atomic: any other operation on the value stored at address must either complete before the CompareAndSwap begins or must wait until the CompareAndSwap completes.

One way to implement efficient locks is to use spin locking. Each lockable object contains a one-word owner field. When a thread needs to lock an object, it just goes into a loop that repeatedly tests if the object is unlocked (lock=0), and if it is unlocked it attempts to claim the lock by setting the lock field to its own thread identifier (thread).

Spin locking has a number of major advantages: it is simple to implement; it requires only one word of space overhead in the object; and if locks are released quickly it is very efficient.

However, spin locking also suffers from some major disadvantages, particularly on a uniprocessor. If locks are not released quickly, or if contention for shared objects is high, then a large amount of computation will be wasted in "spinning". On a uniprocessor, the spin-lock loop is usually modified so that the processor is yielded every time the lock acquisition fails, in order that the thread does not waste an entire time slice in spinning while other threads are waiting to run.

With spin-locking, the queues for the objects being locked are essentially encoded in the thread scheduler. When there is not much locking, this works very well. When locking is frequent and/or contention is high, then on a uniprocessor a great deal of time is wasted in scheduling threads which immediately yield again because they still can not acquire the desired lock. On a multiprocessor, a lot of excess traffic to main memory is generated by spin-locking, and this also degrades performance. A good summary and investigation of the multiprocessor performance issues is *The Performance of Spin Lock Alternatives for Shared-Memory Multiprocessors*, by T. E. Anderson, IEEE Transactions on Parallel and Distributed Systems, volume 1, number 1, January 1990.

Finally, with spin-locking, the order in which locks are granted is non-deterministic and potentially unfair. That is, the first thread to attempt to lock an object may have to wait arbitrarily long while many other threads obtain the lock.

The primary alternative to spin-locking is queued locking. When a thread fails to obtain a lock on an object, it places itself on a queue of threads waiting for that object, and then suspends itself. When the thread that owns the lock releases the lock, it checks if any threads are enqueued on the object. If so, it removes the first thread from the queue, locks the object on behalf of the waiting thread, and resumes the waiting thread.

Unlike spin-locking, queued locking is fair. Performance is good except when objects are locked for short periods of time and there is contention for them. Then the overhead of enqueueing and suspending becomes a factor. However, when objects are locked for longer periods of time and/or when contention is low, queued locking is generally more efficient than spin-locking.

The basic problem with queued locking has to do with the management of the queues. The queues for a shared object are themselves shared objects (even while the object is locked). Therefore, some sort of mechanism is required to assure mutual exclusion on the object queues.

Furthermore, there is a race condition inherent in the lock release policy: one thread may attempt to enqueue for the object at the same time that the owning thread is releasing the lock.

The simplest way to solve both of these problems is to use a global spin-lock to guard the short critical sections for lock acquisition, release, and enqueueing. Every object now contains not only a lock field but also a queue field.

Unfortunately, locking an unlocked object (the most common case) has now become significantly slower and more complex. There is also a global lock for which there could be significant contention as the number of threads increases (that is, the solution does not scale).

However, provided with some extra hardware support, this problem can be solved; in particular, with an atomic CompareAndSwapDouble machine instruction that atomically compares and swaps two words. Such hardware support is available on Intel Pentium processors in the form of the CMPXCHG8B instruction.

With CompareAndSwapDouble, an atomic operation can be performed which simultaneously releases the lock and makes sure that the queue of waiting threads is empty.

However, there are a number of serious drawbacks to using CompareAndSwapDouble: (1) it is slower than the single-word CompareAndSwap operation, (2) it requires that the lock and the queue be adjacent in memory, reducing flexibility and potential for space optimization, and (3) it is not available on many processors.

SUMMARY OF THE INVENTION

The above-stated problems and related problems of the prior art are solved by the principles of the present invention, locking and unlocking mechanism for controlling concurrent access to objects. The structure for a lock consists of two parts: a thread pointer (or thread identifier), and a one-bit flag called a "Bacon bit". Preferably, when an object is not locked (i.e., no thread has been granted access to the object), the thread identifier and Bacon bit are set to 0. When an object is locked by a particular thread (i.e., the thread has been granted access to the object), the thread identifier is set to a value that identifies the particular thread; if no other threads are waiting to lock the object, the Bacon bit is set to 0; however, if other threads are waiting to lock the object, the Bacon bit is set to '1', which indicates the there is a queue of waiting threads associated with the object.

Present machines are typically word-aligned byte-addressed architectures, so the low two bits of word addresses are zero. In order to exploit such architectures, the two parts of the lock together preferably form a single word, wherein the Bacon bit is stored in the least significant bit of the lock, and the most significant bits of thread pointer (except for the least significant bit) are stored in the upper bits of the lock. Thus, the complete thread pointer can be reconstructed by appending a '0' as the least significant bit to the most significant bits stored in the lock.

To lock an object, a single CompareAndSwap operation is preferably used, much like with spin-locks; if the lock is already held by another thread, enqueueing is handled in out-of-line code. Locking is always easier to implement efficiently; the usefulness of the Bacon bit can be seen in the unlock routine.

To unlock an object, in the normal case, a single CompareAndSwap operation may be used. This single operation atomically tests that the current thread owns the lock, and that no other threads are waiting for the object (i.e., the Bacon bit is '0').

A global lock is preferably used to change the Bacon bit of the lock.

DETAILED DESCRIPTION OF A PREFERRED EMBODIMENT OF THE INVENTION

The invention applies to all computer systems that synchronize access to shared objects via locks.

Referring to the drawings, normal rectangles such as 301 enclose code, using the operators of C++ (but omitting details such as type declarations). The CompareAndSwap operation is abbreviated C&S. Assignment is via the "=" operator; equality testing via the "==" operator; bit-wise and via the "&" operator; bit-wise or via the "|" operator; and unary ones-complement via the "~" operator. Boxed rectangles such as 305 enclose abstract operations, the details of which are not specified.

Figure 1:
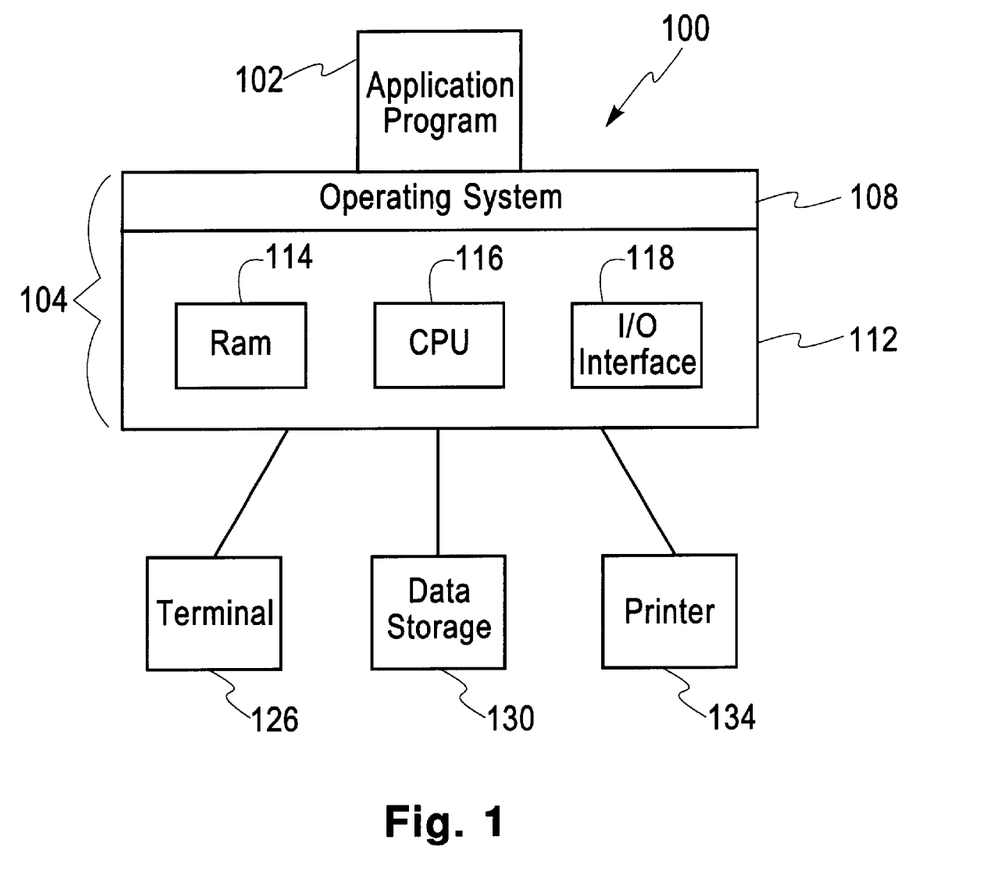
FIG. 1 is a block diagram showing a computer system on which the locking and unlocking mechanism of the present invention may be implemented.

Referring now to FIG. 1, there is shown a block diagram showing a computer system 100 on which a preferred embodiment of the present invention operates. The computer system 100 includes one or more application programs 102 and an operating system 108 that operate on a computer platform 104. The platform 104 includes a hardware unit 112 that includes one or more central processing units 116 (which are typically referred to as CPUs/processors), a random access memory (RAM) 114, and an input/output interface 118. Various peripheral components may be connected to the computer platform 104 including a terminal 126, a data storage device 130, and a printing device 134. The operating system 108 coordinates the operation of the various components or the computer system 100. An example of computer system 100 like this is the IBM RISC System/6000 (RISC System/6000 is a trademark of the IBM Corporation.) It is readily understood that those skilled in the computer arts will be familiar with many equivalent computer systems 100.

The operating system 108 of the present invention provides multi-threading capabilities wherein multiple concurrent threads of control are dispatched within a single shared address space. Examples include the built-in thread support of Microsoft's Windows NT operating system, and the POSIX threads package that is available on many operating systems, for instance as the pthreads package of IBM's AIX operating system. The locking mechanism of the present invention may be used with such thread environments whenever it is necessary to control concurrent access to shared objects.

In describing the present invention, the current thread is denoted by the identifier thread.

The operations on a thread typically include a suspend operation and a resume operation. The suspend operation stops execution of the thread and removes it from the list of "ready" threads that can be scheduled to run. The resume operation places a thread back on the "ready" list and allows it to run again. These operations must be implemented with a semaphore to prevent a race condition between a thread suspending itself and being resumed by another thread.

Certain objects may have the LOCK and UNLOCK operations applied to them. Which objects are lockable objects may be determined by the language environment—for instance, in a Java system, every object is a lockable object; or the lockable objects may be specified by the programmer. Each lockable object is associated with a lock (i.e., data that indicates if access to an object has been locked by a thread) and a queue (i.e., data that identifies threads waiting to obtain a lock on the associated object). The lock may be contained at a predetermined location within the object; or, in the alternative, located in a table outside the object and looked up by hashing on the address of the object. The queue may be contained at a predetermined location within the object; the head of the queue could be a pointer inside the object; or the queue could be located in a table and looked up by hashing on the address of the object. A practitioner skilled in the arts will realize that other representations of the lock and queue are possible and will be able to select the appropriate lock and queue representations according to the space-time tradeoffs dictated by the particular implementation environment.

Figure 2:
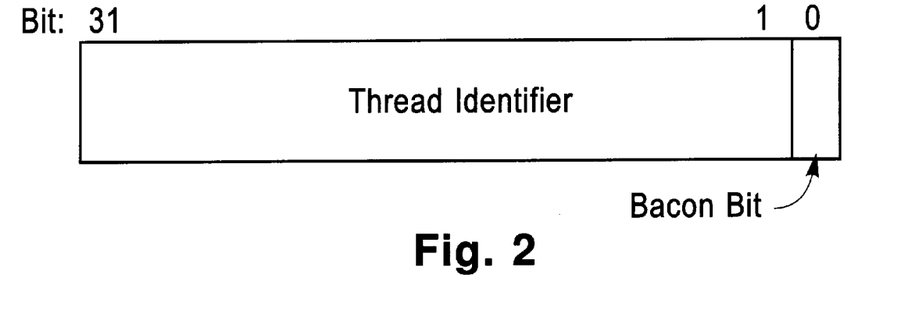
FIG. 2 illustrates the structure of a lock according to the present invention.

According to the present invention, a lock associated with an object comprises a thread pointer (or thread identifier) and a flag called the "Bacon bit" as illustrated in FIG. 2.

Present machines are typically word-aligned byte-addressed architectures, so the low two bits of word addresses are zero. In order to exploit such architectures, the two parts of the lock together preferably form a single word, wherein the Bacon bit is stored in the least significant bit of the lock, and the most significant bits of thread pointer (except for the least significant bit) are stored in the upper bits of the lock. Thus, the complete thread pointer can be reconstructed by appending a '0' as the least significant bit to the most significant bits stored in the lock. However, the present invention is not limited in this respect and can be utilized with other architectures.

When an object is not locked by a thread (i.e., no thread has been granted access to the object), the contents of the lock is set to a predetermined value, such as '0', that indicates that the object is not locked by a thread. In one embodiment, the thread identifier is set to a predetermined value, such as '0', that indicates that the object is not locked by a thread. In an alternate embodiment, the lock (the thread identifier and Bacon bit) may be set to a predetermined value, such as '0', that indicates that the object is not locked by a thread. This provides for confirmation that an object is not locked by a thread by evaluating the lock without masking the Bacon bit.

When an object is locked by a particular thread (i.e., the thread has been granted access to the object), the thread identifier is set to a value that identifies the particular thread. If no other threads are waiting to lock the object, the "Bacon bit" is set to a predetermined value, such as '0', which indicates that no other threads are waiting to lock the object, however, if other threads are waiting to lock the object, the "Bacon bit" is set to a predetermined value, such as '1', which indicates the there is a queue of waiting threads associated with the object.

Note that there is an important special case in which the thread identifier is a single bit which simply indicates whether or not the object is locked. The actual owner of the lock can be stored in some other structure (for instance in thread-local storage), or can be omitted entirely if threads can be trusted to unlock only those objects which they have previously locked.

Figure 3:
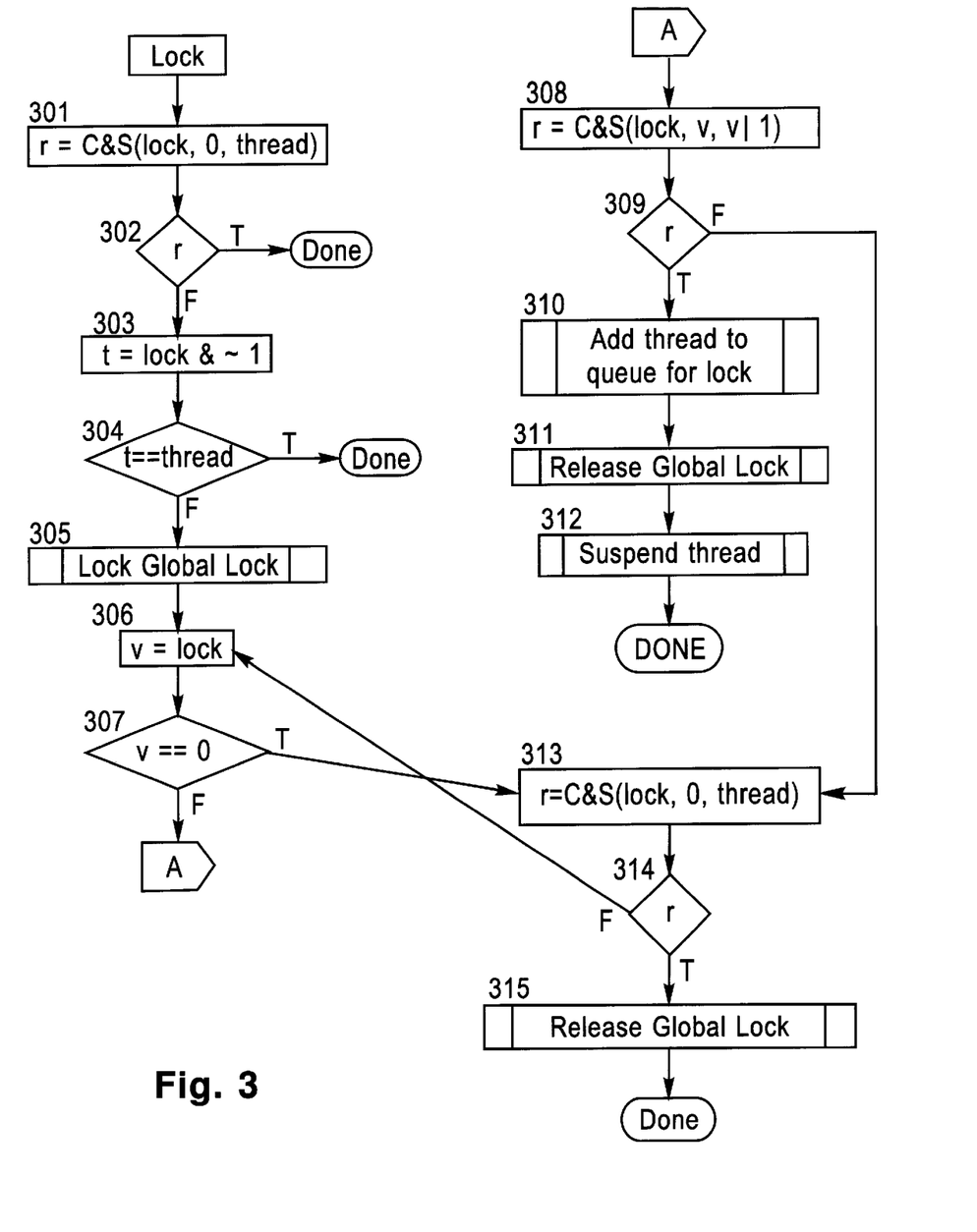
FIG. 3 is a flow diagram illustrating the logic of the lock operation according to the present invention.

FIG. 3 is a flow chart illustrating the operations performed when a thread (referred to below as the current thread) obtains a lock on an object. It begins in step 301 by determining if the object is not locked by a thread. This is preferably accomplished with a CompareAndSwap operation on the lock associated with the object. More specifically, the CompareAndSwap operation reads the contents of the lock and determines if the contents of the lock is equal to the predetermined value indicating that the object is not locked by a thread. If the contents of the lock is equal to the predetermined value indicating that the object is not locked by a thread (i.e., equal to '0'), the thread identifier of the lock is updated to identify the current thread and the operation returns "true" and ends; otherwise the CompareAndSwap operation returns "false" and ends.

In step 302, the result of the CompareAndSwap operation of step 301 is tested. If the CompareAndSwap operation of step 301 returns "true", the object has been successfully locked and the procedure terminates. However, if in step 302 it is determined that the CompareAndSwap operation returns "false", operation continues to step 303 where there are two possibilities: either the current thread already owns the lock, or the current thread is trying to lock an object already locked by another thread.

In step 303, the thread identifier t of the thread that owns the lock is identified. Preferably, the thread identifier t is computed by masking out the Bacon bit from the lock.

In step 304, it is determined whether t is equal to the thread identifier corresponding to the current thread. If t is equal to the thread identifier corresponding to the current thread, then the current thread owns the lock and the procedure terminates successfully; otherwise operation continues to step 305.

If the program reaches step 305, the object is locked by another thread and the current thread must enqueue itself for the object (i.e., the current thread must be added to the queue of waiting threads associated with the object).

Preferably, no changes are made to the queues or to the Bacon bits of objects unless the modifier holds a global lock. The global lock guarantees mutual exclusion for access to the queue and the Bacon bit. While a single global lock is used in the preferred implementation, it is actually possible to arbitrarily partition the global lock. In fact, an implementation could have a "queue lock" for each lockable object.

To enqueue the current thread for the object, the current thread preferably obtains a global lock in step 305 and copies the contents of lock into the local variable v in step 306. One way to implement the global lock of step 305 is to define a variable, global_lock, that when set to '0' indicates that no thread holds the global lock and when set to '1' indicates that a thread holds the global lock. The current thread then obtains global lock by performing a loop that waits until global_lock is set to '0'; and upon determining that the global_lock is set to '0', sets the global_lock to '1' and exits the loop.

In step 307, the copy v obtained in step 306 is evaluated to determine if the owning thread has released the lock between the execution of steps 301 and 306, (which is preferably indicated by v being set to '0'). If the owning thread has released the lock (i.e., v is set to '0'), control is transferred to step 313 wherein another attempt is made to lock the object. If the owning thread has not have released the lock (i.e., v is not set to '0'), and the procedure proceeds to step 308.

In step 308, the Bacon bit of the lock associated with the object is updated, if need be, to indicate that there is a queue of waiting threads associated with the object. One way of updating the Bacon bit in step 308 is to perform a CompareAndSwap operation on the lock associated with the object. More specifically, the CompareAndSwap operation reads the contents of the lock and determines if contents of the lock is equal to the value v obtained in step 306. If the contents of the lock is equal to the value v, the last bit of v is modified, if need be, such that it is set to '1', the contents of lock are updated with the modified value of v (i.e., v|1) and the operation returns "true" and ends. If the contents of the lock is not equal to the value v, the CompareAndSwap operation returns "false" and ends.

In step 309, the result of the CompareAndSwap operation of step 308 is tested. If the CompareAndSwap operation of step 308 returns "true", then either the thread that owns the lock or some other thread has modified the lock field of the object, and control is transferred to step 313; however, if the CompareAndSwap operation of step 308 returns "false", control passes to step 310.

In step 310, the current thread is added to a queue associated with the object. In step 311, the global lock is released. This may be accomplished by setting the variable global_lock to '0' to thereby indicate that no thread holds the global lock. Finally, in step 312 the current thread suspends itself and the lock operation is complete.

The suspended thread will either be resumed when the thread immediately prior to itself on the queue releases the lock on the object, or if there is no other thread queued for the object, when the currently owning thread releases its lock on the object.

As described above, if either step 307 or step 309 detects that the lock field has changed while the procedure is executing, control branches to step 313 wherein once again a CompareAndSwap operation is performed on the lock associated with the object to determine if the object is not locked by a thread. More specifically, the CompareAndSwap operation reads the contents of the lock and determines if the contents of the lock is equal to the predetermined value indicating that the object is not locked by a thread. As described above, the content of the lock is preferably set to '0' to indicate that the object is not locked by a thread. If the contents of the lock is equal to the predetermined value indicating that the object is not locked by a thread (i.e., ='0'), the thread identifier of the lock is updated to identify the current thread and the operation returns "true" and ends, otherwise the CompareAndSwap operation returns "false" and ends.

In step 314, the result of the CompareAndSwap operation of step 313 is tested. If the CompareAndSwap operation of step 313 returns "true", the lock has been obtained, and control passes to step 315. In step 315, the global lock is released and the procedure then terminates successfully. The global lock may be released by setting the variable global_lock to '0' to thereby indicate that no thread holds the global lock.

However, if the CompareAndSwap operation of step 313 returns "false", control is returned to step 306 and the process is repeated.

In a uniprocessor system, where the scheduling interval will typically be many times longer than the time required to execute an iteration of the locking loop (the loop between steps 306 and step 313), then the loop should always terminate within two iterations. However, in a multiprocessor system, an extremely pathological scenario is theoretically possible in which one thread holds the global lock indefinitely because it is trying to acquire a lock while the owning thread that is in an infinite loop acquiring and releasing the lock, thus starving out the new locker. While the details have been omitted in the interests of simplicity in the presentation, a practitioner skilled in the arts will be able to solve this problem by limiting the number of iterations in the loop between steps 306 and 314, and temporarily releasing the global lock when that limit has been reached.

Once a thread has obtained a lock on an object, it has exclusive access to the object and can modify it freely despite the presence of concurrent threads attempting to modify the object. For instance, the thread could now update a locked bank account record or perform output to a locked printer.

Figure 4:
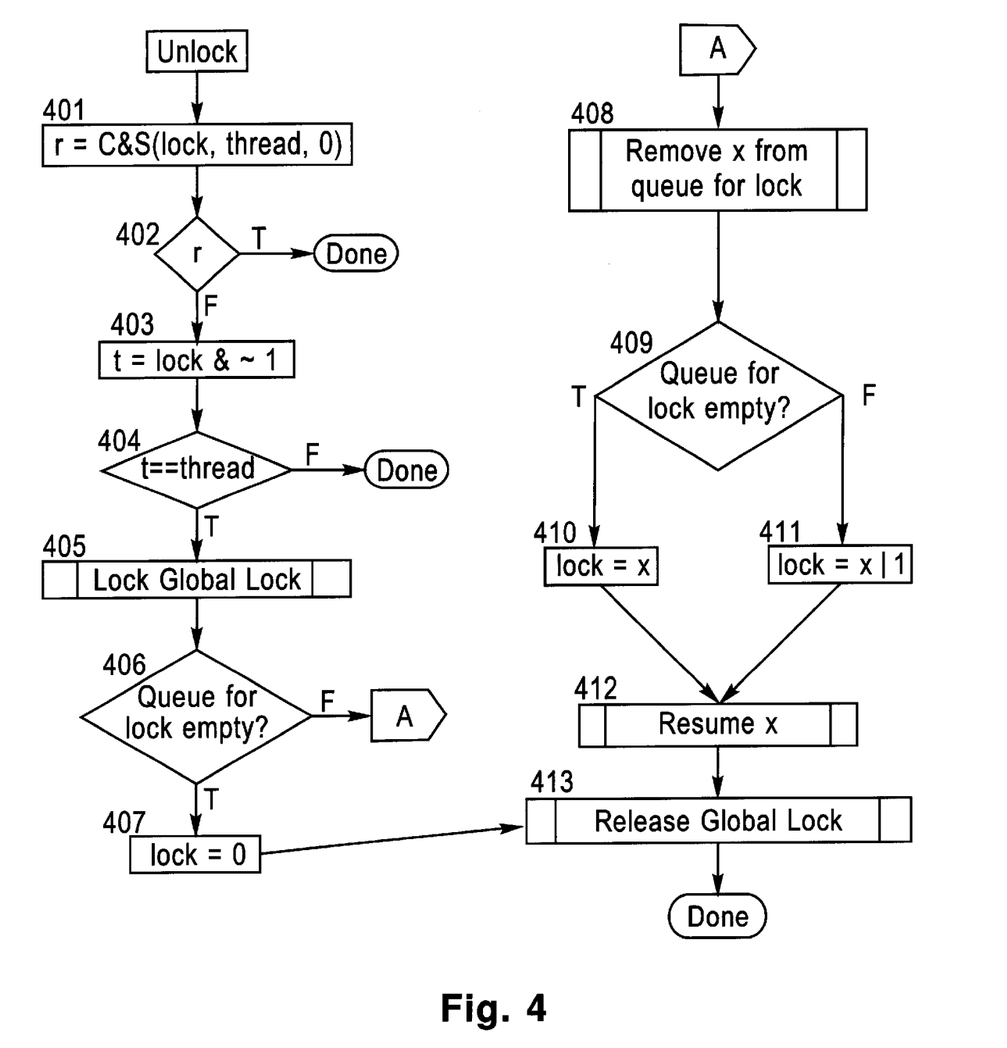
FIG. 4 is a flow diagram illustrating the logic of the unlock operation according to the present invention.

FIG. 4 is a flow chart illustrating the operations for the current thread to unlock an object. It begins in step 401 by determining whether the following two conditions are satisfied:

1) the thread that owns the lock associated with the object corresponds to the current thread; and 2) the Bacon bit of the lock indicates that there is not a queue of waiting threads associated with the object (i.e., Bacon bit is set to '0').

If these two conditions are satisfied, the lock is replaced with the predetermined value indicating that the object is not locked by a thread (i.e., equal to '0'). These steps may be accomplished by a CompareAndSwap operation that atomically tests whether the lock associated with the object is equal to the thread identifier corresponding to the current thread. If the lock is equal to the thread identifier corresponding to the current thread, the lock is replaced with the predetermined value indicating that the object is not locked by a thread (i.e., equal to '0') and the operation returns "true" and ends. If lock is not equal to the thread identifier corresponding to the current thread, the operation returns "false" and ends.

In step 402, the result of the CompareAndSwap operation of step 401 is tested. If the CompareAndSwap operation of step 401 returns "true", then the lock has been successfully released and the procedure terminates. However, if the CompareAndSwap operation of step 401 returns "false", then operation continues to step 403.

If the operation continues to step 403, then either the current thread does not own the lock and is not entitled to release it, or the Bacon bit is set indicating that there are other threads queued to lock the object.

In step 403, the thread identifier portion t of the lock is computed preferably by masking out the Bacon bit from the lock, and operation continues to step 404.

In step 404, the thread identifier portion t is compared to the thread identifier corresponding to the current thread. If they are not the same, then some other thread owns the lock and the current thread is not entitled to release it. The procedure terminates unsuccessfully, and may optionally signal an error condition. If the values are equal, the operation continues to step 405. In this case, the current thread owns the lock. Moreover, since step 404 is reached only if the CompareAndSwap operation of step 401 failed, the Bacon bit of the lock field must therefore be equal to '1', indicating that there are other threads queued to lock the object.

In step 405, the current thread preferably acquires a global lock. As described above, one way to implement the global lock is to define a variable, global_lock, that when set to '0' indicates that no thread holds the global lock and when set to '1' indicates that a thread holds the global lock. The current thread then obtains global lock by performing a loop that waits until global_lock is set to '0'.

In step 406, the queue of threads associated with the object is tested for emptiness. The queue may be empty if the queued thread(s) removed themselves from the queue between the execution of steps 401 and 405.

If in step 406 the queue is determined to be empty, operation continues to step 407 wherein the lock associated with the object is updated to indicate the object is not locked by a thread (i.e., the lock is set to '0'). Note that because the current thread holds both the global lock and the object lock, the lock can be released without using a CompareAndSwap operation. After the lock has been released in step 407, control is transferred to step 413 which releases the global lock, and the procedure terminates successfully.

If the test of step 406 determines that the queue is not empty, control proceeds to step 408. In step 408, one of the thread identifiers x stored in the queue is removed from the queue. The lock will now be assigned to thread corresponding to the thread identifier x.

In step 409, the queue is once again tested for emptiness. If it is empty, operation continues to step 410 wherein the thread identifier portion of the lock is updated to correspond to the value of the thread identifier x and the Bacon bit of the lock is set to indicate that there are no other threads queued to lock the object (i.e., set to '0'). If in step 409 the queue is not empty, operation continues to step 411 wherein the thread identifier portion of the lock is updated to correspond to the value of the thread identifier x and the Bacon bit of the lock is set to indicate that there are other threads queued to lock the object (i.e., set to '1'). This may be accomplished by setting the lock field to the value of the thread identifier x or'ed with the Bacon bit 411. Once again, note that because the current thread holds both the global lock and the object lock, the lock can be assigned without using a CompareAndSwap operation.

In either case, control proceeds to step 412 which resumes the thread corresponding to the thread identifier x, which has now been granted the lock on the object.

Finally, in step 413, the global lock is released, and the procedure terminates successfully. For example, the global lock may be released by setting global_lock to '0' to thereby indicate that no thread holds the global lock.

The advantages of the present invention are as follows:

- in the common case of locking an unlocked object, lock acquisition consists of a single atomic compare-and-swap operation, requiring only a small number of machine instructions;
- in the common case of unlocking an object with no other threads waiting to lock the object, the lock release operation consists of a single atomic compare-and-swap operation, requiring only a small number of machine instructions;
- when there is contention, locks can be granted fairly, in the order in which the requests were made;
- in the absence of contention, the space required for the lock per locked object is only one bit for the Bacon bit plus the number of bits required for the thread pointer or thread identifier;
- spin-locking is minimized; and
- the same algorithm can be applied to a uniprocessor or a multiprocessor (with suitable adjustment of the atomic operations), and yields an efficient implementation for each type of architecture.

Having thus described our invention, what I claim as new and desire to secure by Letters Patent is as follows:

1. A method for controlling concurrent access to an object in a multi-threaded computer processing system, the method comprising the steps of:

storing in memory a lock that is associated with said object, said lock comprising a thread identifier field and a flag field;

wherein, when said object is not locked by any thread, a portion of said lock is set to a predetermined value that indicates that the object is not locked by any thread;

wherein, when an object is locked by a particular thread, said thread identifier field is set to a value that identifies the particular thread, if no other threads are waiting to lock the object, said flag field is set to a predetermined value that indicates that no other threads are waiting to lock the object, and if other threads are waiting to lock the object, said flag field is set to a predetermined value which indicates that there is a non-empty queue of waiting threads associated with the object.

2. The method of claim 1, wherein, when said object is not locked by any thread, said portion of said lock that is set to a predetermined value that indicates that the object is not locked by any thread comprises said thread identifier field and flag field of said lock.

3. The method of claim 1, wherein, when said object is not locked by any thread, said portion of said lock that is set to a predetermined value that indicates that the object is not locked by any thread comprises said thread identifier field of said lock.

4. The method of claim 1, wherein said flag field is a single bit.

5. The method of claim 1, wherein said thread identifier field and said flag field comprise a word having a more significant portion distinct from a less significant portion, wherein said flag field is stored in said less significant portion and said thread identifier field is stored in said more significant portion.

6. The method of claim 1, further comprising the step of evaluating said lock associated with said object in order to determine whether to grant a first thread access to said object.

7. The method of claim 6, wherein the evaluating step utilizes an atomic compare and swap operation that determines if said portion of said lock is set to said predetermined value that indicates that the object is not locked by any thread, and if so, stores the thread identifier associated with said first thread as said thread identifier field of said lock to thereby grant said first thread access to said object.

8. The method of claim 7, wherein, if said compare and swap operation determines that said portion of said lock is not set to said predetermined value that indicates that the object is not locked by any thread, determining whether said thread identifier field of said lock is associated with another thread other than said first thread, and if so, obtaining a global lock.

9. The method of claim 8, wherein, upon obtaining said global lock, a second atomic operation is performed that sets said flag field of said lock to said predetermined value which indicates the there is a non-empty queue of waiting threads associated with the object.

10. The method of claim 9, wherein said second atomic operation comprises an atomic compare and swap operation.

11. The method of claim 9, wherein, upon successful completion of said second atomic operation, the thread identifier associated with said first thread is added to a queue of waiting threads associated with said object, said global lock is released and said first thread is suspended.

12. The method of claim 1, further comprising the step of evaluating said lock associated with said object in order to determine whether to unlock access to said object.

13. The method of claim 12, wherein, when a first thread issues an operation to unlock access to said object, the evaluating step utilizes an atomic compare-and-swap operation to determine if said thread identifier field of said lock associated with said object corresponds to said first thread and said flag field of said lock is set to a predetermined value that indicates that no other threads are waiting to lock the object.

14. The method of claim 12, wherein if said compare-and-swap operation determines that said thread identifier field of said lock corresponds to said first thread and said flag field of said lock is set to a predetermined value that indicates that no other threads are waiting to lock the object, said compare and swap operation updates said lock to indicate that said object is not locked by any thread.

15. The method of claim 12, further comprising the step of:
upon determining that said thread identifier field of said lock corresponds to said first thread and said flag field of said lock is not set to a predetermined value that indicates that no other threads are waiting to lock the object, obtaining a global lock.

16. The method of claim 15, further comprising the steps of:
upon obtaining said global lock, evaluating said queue associated with said object to determine if no other threads are waiting to access said object; and
upon determining that no other threads are waiting to access said object, updating said lock associated with said object to indicate that said object is not locked by any thread, and releasing said global lock.

17. The method of claim 15, further comprising the steps of:
upon obtaining said global lock, evaluating said queue associated with said object to determine if other threads are waiting to access said object; and
upon determining that other threads are waiting to access said object, updating said queue to remove a second thread from said queue, resuming said second thread and releasing said global lock.

18. The method of claim 17, further comprising the steps of:
upon updating said queue to remove said second thread, determining if said queue is empty;
if it is determined that said queue is empty, updating said lock such that said thread identifier field of said lock is set to a thread identifier corresponding to said second thread and said flag field is set to said predetermined value that indicates that no other threads are waiting to lock the object; and
if it is determined that said queue is non-empty, updating said lock such that said thread identifier field of said lock is set to a thread identifier corresponding to said second thread and said flag field is set to said predetermined value that indicates that there is a non-empty queue of waiting threads associated with the object.

19. A program storage device readable by a machine, tangibly embodying a program of instructions executable by the machine to perform method steps for controlling concurrent access to an object in a multi-threaded computer processing system, said method steps comprising:

storing in memory a lock that is associated with said object, said lock comprising a thread identifier field and a flag field;
wherein, when said object is not locked by any thread, a portion of sail lock is set to a predetermined value that indicates that the object is not locked by any thread;
wherein, when an object is locked by a particular thread, said thread identifier field is set to a value that identifies the particular thread,
if no other threads are waiting to lock the object, said flag field is set to a predetermined value that indicates that no other threads are waiting to lock the object, and
if other threads are waiting to lock the object, said flag field is set to a predetermined value which indicates that there is a non-empty queue of waiting threads associated with the object.

20. The program storage device of claim 19, wherein, when said object is not locked by any thread, said portion of said lock that is set to a predetermined value that indicates that the object is not locked by any thread comprises said thread identifier field and flag field of said lock.

21. The program storage device of claim 19, wherein, when said object is not locked by any thread, said portion of said lock that is set to a predetermined value that indicates that the object is not locked by any thread comprises said thread identifier field of said lock.

22. The program storage device of claim 19, wherein said flag field is a single bit.

23. The program storage device of claim 19, wherein said thread identifier field and said flag field comprise a word having a more significant portion distinct from a less significant portion, wherein said flag field is stored in said less significant portion and said thread identifier field is stored in said more significant portion.

24. The program storage device of claim 19, further comprising the step of evaluating said lock associated with said object in order to determine whether to grant a first thread access to said object.

25. The program storage device of claim 24, wherein the evaluating step utilizes an atomic compare and swap operation that determines if said portion of said lock is set to said predetermined value that indicates that the object is not locked by any thread, and if so, stores the thread identifier associated with said first thread as said thread identifier field of said lock to thereby grant said first thread access to said object.

26. The program storage device of claim 25, wherein, if said compare and swap operation determines that said thread identifier field is not set to said predetermined value that indicates that the object is not locked by any thread, determining whether said thread identifier field of said lock is associated with another thread other than said first thread, and if so, obtaining a global lock.

27. The program storage device of claim 26, wherein, upon obtaining said global lock, a second atomic operation is performed that sets said flag field of said lock to said predetermined value which indicates the there is a non-empty queue of waiting threads associated with the object.

28. The program storage device of claim 27, wherein said second atomic operation comprises an atomic compare and swap operation.

29. The program storage device of claim 27, wherein, upon successful completion of said second atomic operation, the thread identifier associated with said first thread is added to a queue of waiting threads associated with said object, said global lock is released and said first thread is suspended.

30. The program storage device of claim 19, further comprising the step of evaluating said lock associated with said object in order to determine whether to unlock access to said object.

31. The program storage device of claim 30, wherein, when a first thread issues an operation to unlock access to said object, the evaluating step utilizes an atomic compare-and-swap operation to determine if said thread identifier field of said lock associated with said object corresponds to said first thread and said flag field of said lock is set to a predetermined value that indicates that no other threads are waiting to lock the object.

32. The program storage device of claim 31, wherein if said compare-and-swap operation determines that said thread identifier field of said lock corresponds to said first thread and said flag field of said lock is set to a predetermined value that indicates that no other threads are waiting to lock the object, said compare and swap operation updates said lock to indicate that said object is not locked by any thread.

33. The program storage device of claim 30, further comprising the step of:
upon determining that said thread identifier field of said lock corresponds to said first thread and said flag field of said lock is not set to a predetermined value that indicates that no other threads are waiting to lock the object, obtaining a global lock.

34. The program storage device of claim 33, further comprising the steps of:
upon obtaining said global lock, evaluating said queue associated with said object to determine if no other threads are waiting to access said object; and
upon determining that no other threads are waiting to access said object, updating said lock associated with said object to indicate that said object is not locked by any thread, and releasing said global lock.

35. The program storage device of claim 33, further comprising the steps of:
upon obtaining said global lock, evaluating said queue associated with said object to determine if other threads are waiting to access said object; and
upon determining that other threads are waiting to access said object, updating said queue to remove a second thread from said queue, resuming said second thread and releasing said global lock.

36. The program storage device of claim 35, further comprising the steps of:
upon updating said queue to remove said second thread, determining if said queue is empty;
if it is determined that said queue is empty, updating said lock such that said thread identifier field of said lock is set to a thread identifier corresponding to said second thread and said flag field is set to said predetermined value that indicates that no other threads are waiting to lock the object; and
if it is determined that said queue is non-empty, updating said lock such that said thread identifier field of said lock is set to a thread identifier corresponding to said second thread and said flag field is set to said predetermined value that indicates that there is a non-empty queue of waiting threads associated with the object.

37. A method for controlling concurrent access to an object in a multi-threaded computer processing system, the method comprising the steps of:
storing in memory a lock that is associated with said object, said lock comprising a first flag field and a second flag field;
wherein, when said object is not locked by any thread, a portion of said lock is set to a predetermined value that indicates that the object is not locked by any thread;
wherein, when an object is locked by a particular thread, said first flag field is set to a value that indicates that the object is locked by a thread,
if no other threads are waiting to lock the object, said second flag field is set to a predetermined value that indicates that no other threads are waiting to lock the object, and
if other threads are waiting to lock the object, said second flag field is set to a predetermined value which indicates that there is a non-empty queue of waiting threads associated with the object.

38. The method of claim 37, wherein, when said object is not locked by any thread, said portion of said lock that is set to a predetermined value that indicates that the object is not locked by any thread comprises said first flag field and said second flag field of said lock.

39. The method of claim 37, wherein, when said object is not locked by any thread, said portion of said lock that is set to a predetermined value that indicates that the object is not locked by any thread comprises said first flag field of said lock.

40. The method of claim 37, wherein said first and second flag fields each comprise a single bit.

41. The method of claim 37, further comprising the step of evaluating said lock associated with said object in order to determine whether to grant a first thread access to said object, wherein the evaluating step utilizes an atomic compare and swap operation that determines if said portion of said lock is set to said predetermined value that indicates that the object is not locked by any thread, and if so, updates said first flag field of said lock to indicate that the object is locked by a thread to thereby grant said first thread access to said object.

42. A program storage device readable by a machine, tangibly embodying a program of instructions executable by the machine to perform method steps for controlling concurrent access to an object in a multi-threaded computer processing system, said method steps comprising:
storing in memory a lock that is associated with said object, said lock comprising a first flag field and a second flag field;
wherein, when said object is not locked by any thread, a portion of said lock is set to a predetermined value that indicates that the object is not locked by any thread;
wherein, when an object is locked by a particular thread, said first flag field is set to a value that indicates that the object is locked by a thread,
if no other threads are waiting to lock the object, said second flag field is set to a predetermined value that indicates that no other threads are waiting to lock the object, and
if other threads are waiting to lock the object, said second flag field is set to a predetermined value which indicates that there is a non-empty queue of waiting threads associated with the object.

43. The program storage device of claim 42, wherein, when said object is not locked by any thread, said portion of said lock that is set to a predetermined value that indicates that the object is not locked by any thread comprises said first flag field and said second flag field of said lock.

44. The program storage device of claim 42, wherein, when said object is not locked by any thread, said portion of said lock that is set to a predetermined value that indicates that the object is not locked by any thread comprises said first flag field of said lock.

45. The program storage device of claim 42, wherein said first and second flag fields each comprise a single bit.

46. The program storage device of claim 42, further comprising the step of evaluating said lock associated with said object in order to determine whether to grant a first thread access to said object, wherein the evaluating step utilizes an atomic compare and swap operation that determines if said portion of said lock is set to said predetermined value that indicates that the object is not locked by any thread, and if so, updates said first flag field of said lock to indicate that the object is locked by a thread to thereby grant said first thread access to said object.

\* \* \* \* \*